(12) United States Patent
Petereit et al.

(10) Patent No.: US 8,063,525 B2
(45) Date of Patent: Nov. 22, 2011

(54) RETAINER BEARING FOR AN ELECTRIC MACHINE, AND ELECTRIC MACHINE COMPRISING AT LEAST ONE SUCH RETAINER BEARING

(75) Inventors: Peter Petereit, Berlin (DE); Gunnar Schubert, Berlin (DE); Günther Siegl, Berlin (DE); Hartmut Walter, Berlin (DE)

(73) Assignee: Siemens Aktiengesellschaft, München (DE)

( * ) Notice: Subject to any disclaimer, the term of this patent is extended or adjusted under 35 U.S.C. 154(b) by 587 days.

(21) Appl. No.: 12/298,622

(22) PCT Filed: Mar. 16, 2007

(86) PCT No.: PCT/EP2007/052503
§ 371 (c)(1),
(2), (4) Date: Oct. 27, 2008

(87) PCT Pub. No.: WO2007/124982
PCT Pub. Date: Nov. 8, 2007

(65) Prior Publication Data
US 2009/0091203 A1 Apr. 9, 2009

(30) Foreign Application Priority Data
Apr. 28, 2006 (DE) .......................... 10 2006 019 873

(51) Int. Cl.
*H02K 7/08* (2006.01)
*F16C 17/03* (2006.01)

(52) U.S. Cl. .......................................................... 310/90
(58) Field of Classification Search ..................... 310/90
See application file for complete search history.

(56) References Cited

U.S. PATENT DOCUMENTS

| 4,089,566 | A | * | 5/1978 | Schmidt | 384/215 |
|---|---|---|---|---|---|
| RE34,035 | E | * | 8/1992 | Dimigen et al. | 428/408 |
| 5,752,774 | A | * | 5/1998 | Heshmat et al. | 384/549 |
| 2003/0063826 | A1 | | 4/2003 | Cevasco | |
| 2004/0189124 | A1 | | 9/2004 | Baudelocque | |
| 2004/0240759 | A1 | | 12/2004 | New | |
| 2009/0091203 | A1 | * | 4/2009 | Petereit et al. | 310/90 |

FOREIGN PATENT DOCUMENTS

| DE | 27 11 065 A1 | 9/1978 |
|---|---|---|
| DE | 77 07 833 U1 | 8/1982 |
| DE | 31 41 841 A1 | 5/1983 |
| DE | 35 233 44 A1 | 1/1987 |
| DE | 198 34 914 A1 | 2/2000 |
| EP | 0 381 336 A1 | 8/1990 |
| GB | 547 306 A | 8/1942 |

* cited by examiner

*Primary Examiner* — Quyen Leung
*Assistant Examiner* — David W. Scheuermann
(74) *Attorney, Agent, or Firm* — Henry M. Feiereisen; Ursula B. Day

(57) ABSTRACT

Disclosed is a retainer bearing (1) for retaining a rotor shaft of an electric machine. Said retainer bearing (1) comprises an outer bearing ring (2) and an inner bearing ring (5). At least one gliding element (7) which is preloaded in a radial direction of the retainer bearing (10) is inserted between the outer bearing ring (2) and the inner bearing ring (5).

14 Claims, 3 Drawing Sheets

RETAINER BEARING FOR AN ELECTRIC MACHINE, AND ELECTRIC MACHINE COMPRISING AT LEAST ONE SUCH RETAINER BEARING

BACKGROUND OF THE INVENTION

The invention relates to a retainer bearing for retaining a rotor shaft of an electric machine, wherein the retainer bearing has a bearing outer ring and a bearing inner ring. Furthermore, the invention relates to an electric machine, in particular a turbomachine, comprising at least one such retainer bearing. The electric machine has, in particular, magnetic bearings for bearing the rotor shaft for operation purposes.

Electric machines, in particular rotating electric motors and generators, require bearings for bearing the rotor shaft. Rolling bearings, such as ball bearings or roller bearings, are usually used for this purpose.

Such bearings are no longer advantageous for large electric machines, that is to say, for example, machines with a mass of more than one ton and a rated electrical power of more than 500 kW, in particular of a few megawatts. This applies, in particular, to electric machines which have a maximum rotation speed of more than 4000 rev/min, as is the case, for example, in compressors or pumps. The reason for this is wear of the rolling bearings which increases more than proportionately as the rotation speed of the electric machine increases. The result is regular replacement of the rolling bearings and stoppage of the electric machine and the system components connected to it.

A further disadvantage of the rolling bearings is that the rolling bearings have to be regularly oiled or lubricated. In nature protection or water protection areas, this means that electric machines with rolling bearings can be operated for the purpose of driving compressors, pumps or the like only under strict environmental conditions.

Active magnetic bearings are used instead of rolling bearings in order to solve the abovementioned problems. Such bearings avoid the disadvantages of rolling bearings, such as friction, poor damping and wear. On account of the continual advances in the field of computer and control engineering and power electronics, such active magnetic bearings are highly dynamic and very stable in terms of control. Contact-free, wear-free and stable bearing is possible at very high rotation speeds. A further advantage is that the rigidity and damping of the active magnetic bearing can be electronically adjusted. On account of lubrication which is otherwise required being dispensed with, active magnetic bearings are free of oil and grease and can therefore be used particularly in environmentally sensitive areas of use. An air gap in the range of from 0.1 mm to 0.5 mm is maintained between the magnetic bearing and the rotor shaft to be borne during operational use.

Since an active magnetic bearing may break down due to the system, retainer bearings can be provided, which retainer bearings can hold the rotor shaft when there is no magnetic bearing or generally when the electrical system is switched off. To this end, the retainer bearing has a slightly larger inside diameter compared to the diameter of the rotor shaft, and so the rotor shaft does not touch the retainer bearing in the case of magnetic bearing during operation. The retainer bearing is usually accommodated in the region of the respective end of the rotor shaft in the stator housing of the electric machine. If, in contrast, the rotor shaft is in the form of a hollow shaft, the outside diameter of the retainer bearing is slightly smaller than the inside diameter of the hollow shaft, and so the rotor shaft can retain the rotor shaft from inside.

When a magnetic bearing breaks down, the rotor shaft falls into the retainer bearing. This creates the risk of the rotor performing a so-called "backward whirl" and rolling away along the inner surface of the retainer bearing. In contrast to the rotationally synchronous rotor movement, in the case of which the deflection of the rotor is synchronous with the revolving unbalance excitation, the rotor passes through the orbit in the opposite direction to the rotation of the rotor with a very large amplitude in the case of the backward whirl. In this case, a rotationally synchronous proportion with a very much smaller amplitude superimposes itself, and so an elliptical orbit is produced. This results in very strong forces acting on the rotor and stator, which forces can destroy the machine in an extremely short time.

The risk of the backward whirl increases as the coefficient of sliding friction between the rotor shaft and the retainer bearing increases. The risk can be avoided by virtue of the use of rolling bearings on account of the very small coefficient of rolling friction.

However, rolling bearings are not suitable for retaining large and heavy rotors in the event of a breakdown since there is only one point of contact between the rolling bodies and bearing rings in the case of ball bearings and only one line contact, together with the resultant very high surface pressures, in the case of roller bearings. These high loads can damage the rolling bearings and block the bearing.

For this reason, dry friction bearings are currently used as retainer bearings for large and heavy rotors. In the case of dry friction bearings, there is frictional contact directly between the rotating rotor shaft and the friction layer of the dry friction bearing. It is possible to largely avoid a backward whirl by suitable material selection, for example by using special bronze alloys for the friction layer.

One disadvantage of this solution is that it leads to high surface pressures in the retainer bearing when the rotor shaft first strikes. The reason for this is the different diameter of the dry friction bearing and the rotor shaft. In addition, the simultaneously acting full friction speed occurs in the contact region. This extreme load leads to the friction surface, which primarily comprises a bronze alloy, melting and being deposited on the rotor shaft when the rotor shaft stops in the retainer bearing. This makes it necessary to mechanically rework the rotor shaft after the rotor shaft has stopped in the retainer bearing a few times. Furthermore, it is necessary to switch off the electric machine and the system components connected to it.

SUMMARY OF THE INVENTION

One object of the invention is to specify a retainer bearing which permits the rotor shaft to stop in the retainer bearing many times.

A further object of the invention is to specify a suitable electric machine comprising at least one such retainer bearing.

This object is solved in accordance with the invention by a retainer bearing for retaining a rotor shaft of an electric machine, with the retainer bearing having a bearing outer ring and a bearing inner ring, wherein at least one sliding element, which is prestressed in the radial direction of the retainer bearing, is inserted between the bearing outer ring and the bearing inner ring. The sliding element can also be called a sliding pad.

The virtually play-free arrangement of the bearing outer ring and the bearing inner ring and the at least one sliding element creates a very large contact area for the parts which slide one on the other, and therefore a low surface pressure.

When a magnetic bearing breaks down, the rotor shaft falls into the retainer bearing according to the invention and rolls therein. The inner ring which is made to rotate in a very short time rotates beneath the rotor shaft such that said rotor shaft executes only small compensation movements in the retainer bearing.

The retainer bearing according to the invention advantageously combines low coefficients of friction with high load-bearing capacity. When the shaft stops in the retainer bearing, rolling contact with very small coefficients of friction is established between the rotor shaft and the bearing inner ring. The actual frictional contact takes place between the bearing inner ring and the at least one sliding element or between the bearing outer ring and the at least one sliding element.

The rotor shaft is virtually undamaged in the event of contact on account of the low-wear rolling contact between the rotor shaft and inner ring and in the event of stopping in the retainer bearing. The rotor shaft is not adversely affected by material deposition. The rotor shaft can therefore endure stopping many times in the retainer bearing.

In a particular embodiment, radially acting spring elements are inserted between the at least one sliding element and the bearing outer ring or the bearing inner ring in order to apply the prestress. The radially acting forces can be accurately adjusted by means of the spring elements.

The at least one sliding element preferably has one or more spring chambers for holding a spring element in each case. As a result, the respective spring element can be arrested in the spring chamber so as to save space.

According to a further embodiment, the spring element is a plate spring. Such springs have a particularly compact form.

In a particularly advantageous embodiment, a large number of sliding elements in the form of ring segments are inserted between the bearing outer ring and the bearing inner ring of the retainer bearing. The advantage over a continuous sliding ring as the sliding element is that only those sliding elements or sliding segments whose friction surface is already worn away have to be replaced. This advantageously increases the cost-effectiveness of such a retainer bearing.

A further advantage is that each individual sliding segment can compensate for any possible abrasion of the friction or sliding layer by a radial adjusting movement by means of the prestress independently of the adjacent sliding segments.

The bearing outer ring and the bearing inner ring are preferably produced from steel with the high mechanical strength which is known and advantageous.

If the at least one sliding element is manufactured from steel, it likewise has a high mechanical strength. If, as an alternative, the at least one sliding element is manufactured from a ceramic which is, in particular, stable at high temperatures, the sliding element can advantageously absorb a larger amount of heat which is produced by the friction when the rotor shaft stops.

In one embodiment, the inner surface of the bearing outer ring and an adjoining outer friction surface of the at least one sliding element are provided such that a coefficient of sliding friction in the range of from 0.05 to 0.15 results. This can be achieved by suitable material selection of the bearing outer ring and the sliding elements. Coefficients of sliding friction in the abovementioned range reduce the risk of a backward whirl to a considerable extent.

In a particularly advantageous embodiment, a sliding layer is applied to the outer friction surface of the at least one sliding element and/or to the inner surface of the bearing outer ring. Such a sliding layer can be applied electrochemically. As an alternative, such a sliding layer can be applied by means of a plating method or by means of an adhesive bonding method. In this way, the coefficient of sliding friction can be accurately set in the range of from 0.05 to 0.15.

In one embodiment, the outer surface of the bearing inner ring and an adjoining inner friction surface of the at least one sliding element are provided such that a coefficient of sliding friction in the range of from 0.05 to 0.15 results. This can be achieved by suitable material selection of the bearing inner ring and the sliding elements. Coefficients of sliding friction in the abovementioned range reduce the risk of a backward whirl to a considerable extent in this embodiment too.

In a particularly advantageous embodiment, a sliding layer is applied to the inner friction surface of the at least one sliding element and/or to the outer surface of the bearing inner ring. Such a sliding layer can, as described above, be applied electrochemically, by means of a plating method or by means of an adhesive bonding method. In this way, the coefficient of sliding friction can be accurately set in the range of from 0.05 to 0.15.

In a further embodiment, the inner surface of the bearing inner ring and the outer surface of the rotor shaft of the electric machine, which rotor shaft is to be held, are provided such that a coefficient of static friction of at least 0.4 results in the event of retention. As a result, the inner ring is made to rotate after the rotor shaft impacts in the retainer bearing, with the bearing inner ring rotating away under the rotor shaft even after a very short time. The inner surface of the bearing inner ring and the outer surface of the rotor shaft are preferably produced from hardened steel, so that the bearing inner ring and the rotor shaft are virtually undamaged.

When the rotor shaft first impacts in the retainer bearing, the sliding layer is only subjected to a pressure load since the bearing inner ring is still at a standstill at this time. The bearing inner ring begins to rotate and rub over the sliding layer on account of the relatively high static friction between the rotor shaft and the bearing inner ring only when the first jolt of impact has passed. This time delay between the jolt load and high friction speed protects the sliding layer.

In a particular embodiment, the retainer bearing is designed as a dry friction bearing and therefore advantageously so as to be free of oil and grease.

The object is also achieved by an electric machine, in particular by a turbomachine, comprising at least one retainer bearing according to the invention. The rotor shaft can be retained in the retainer bearing several times by means of the retainer bearing according to the invention, without mechanical reworking of the rotor shaft being required. The electric machine is therefore advantageously available for longer periods of time. Downtimes are reduced.

The electric machine particularly has at least one magnetic bearing for advantageously wear-free bearing of the rotor shaft for operation purposes, as described in the introduction.

The electric machine is, in particular, an electric motor or generator with a rated electrical power of at least 500 kW.

BRIEF DESCRIPTION OF THE DRAWING

Further advantageous properties of the invention can be found from the exemplary explanation of said invention with reference to the figures, in which.

DETAILED DESCRIPTION OF PREFERRED EMBODIMENTS

Figure 1:
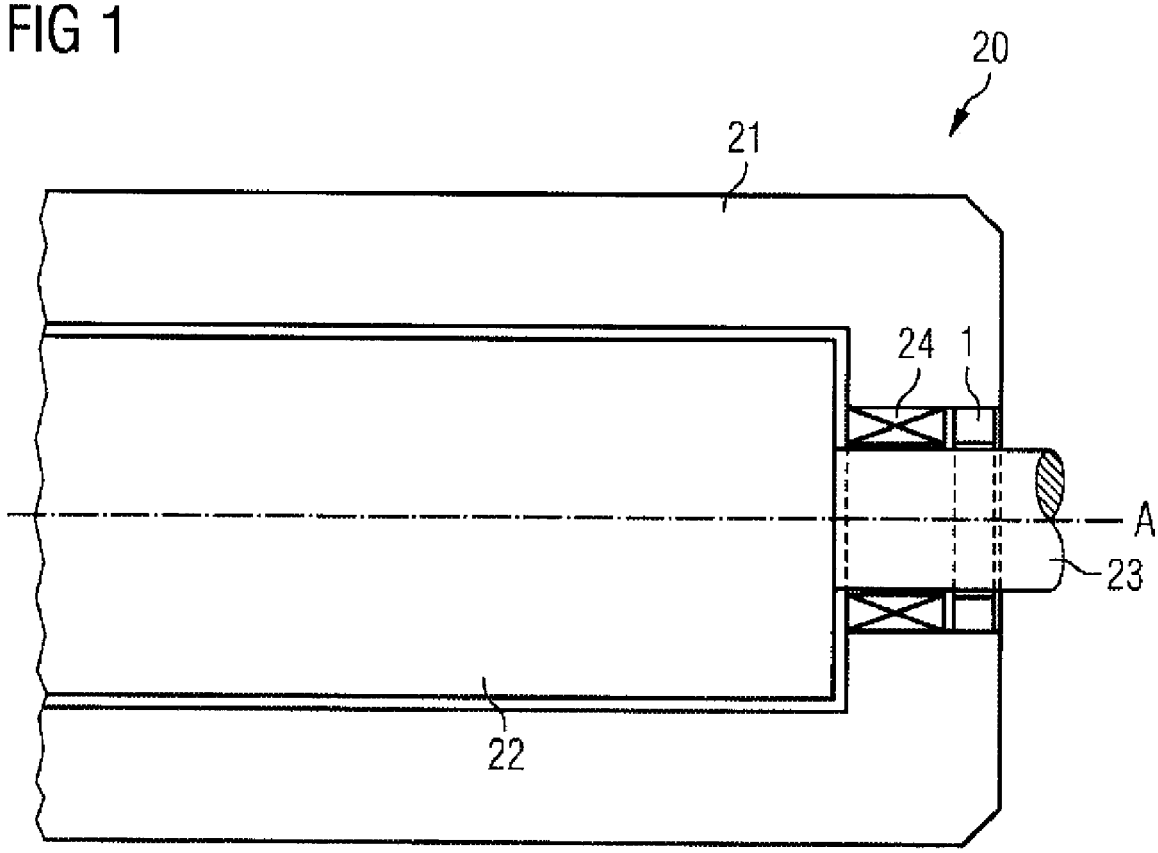
FIG. 1 shows a detail of a cross section through an electric machine comprising a magnetic bearing and a retainer bearing for retaining a rotor shaft according to the invention.

FIG. 1 shows a detail of a cross section through an electric machine 20 comprising a magnetic bearing 24 and a retainer bearing 1 for retaining a rotor shaft 23 according to the invention. Reference sign A denotes the axis of rotation of the electric machine, and reference sign 21 denotes the stator housing of the electric machine 20. The rotating electric machine 20 shown may be an electric motor or a generator. The electric machine 20 preferably has a continuous rated power of at least 500 kW. Said electric machine may be in the form of a turbomachine. The magnetic bearing 24 serves to bear the rotor shaft 23 for operation purposes. The retainer bearing 1 serves to retain the rotor shaft 23 when the magnetic bearing 1 is switched off or breaks down.

In current FIG. 1, both the magnetic bearing 24 and the retainer bearing 1 are accommodated in the stator housing 21 of the electric machine 20. The outer bearing ring of the retainer bearing 1 is preferably mounted in a damping and sprung manner there.

Figure 2:
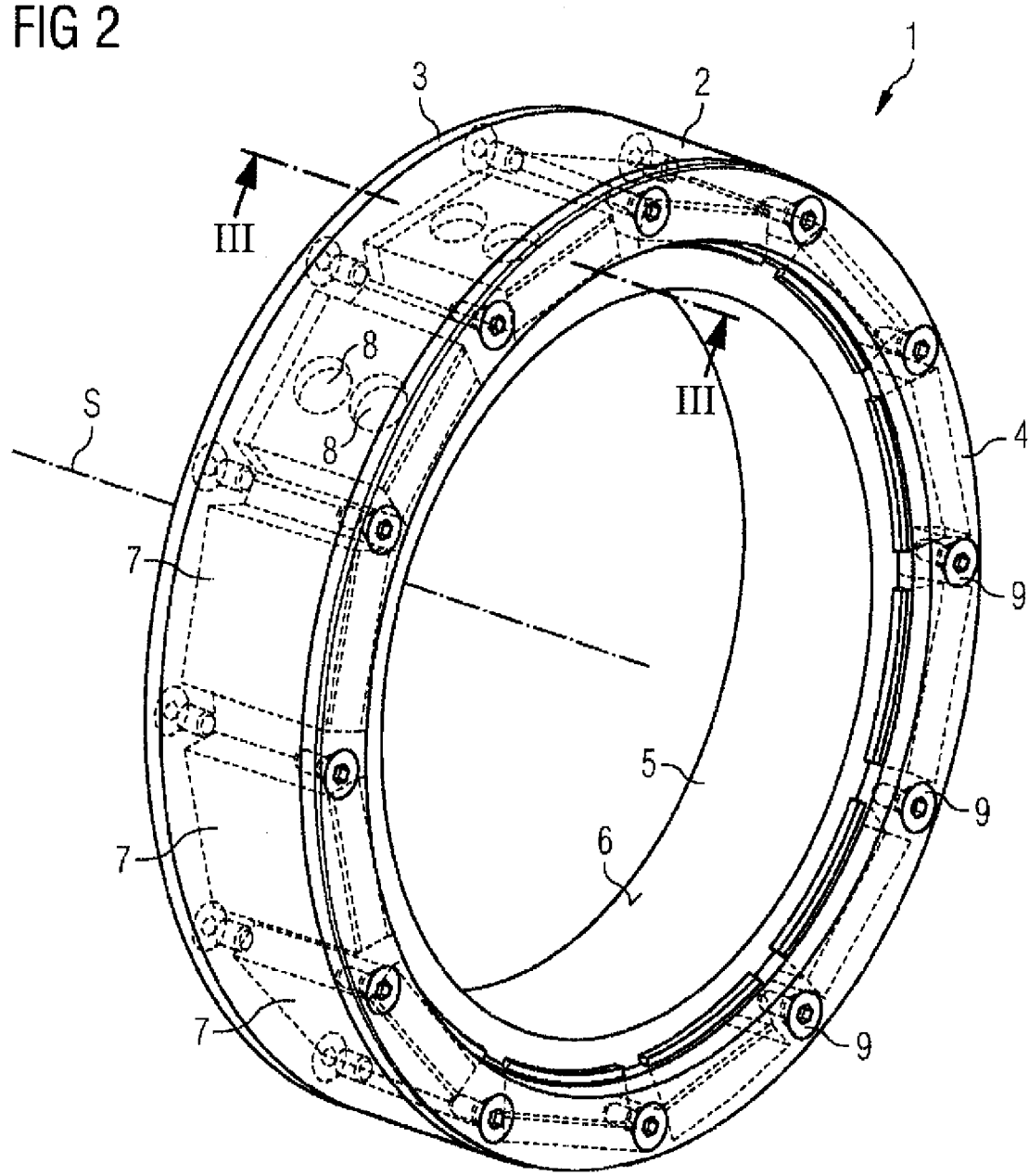
FIG. 2 shows a perspective view of the retainer bearing comprising, by way of example, 12 sliding elements in the form of ring segments between a bearing outer ring and a bearing inner ring.

FIG. 2 shows a perspective view of the retainer bearing 1 with a number of sliding elements 7 in the form of ring segments which are inserted between a bearing outer ring 2 and a bearing inner ring 5. Reference sign S denotes the axis of symmetry of the retainer bearing 1, which axis of symmetry coincides with the axis of rotation A of the electric machine 20 after installation of the retainer bearing 1. The retainer bearing 1 is designed as a dry friction bearing and accordingly so as to be free of oil and grease.

According to FIG. 2, there are 12 sliding elements 7. However, there could be another number of sliding elements 7, for example 2, 3, 8 or 15 sliding elements.

Each sliding element or sliding segment 7 has, according to the example of FIG. 2, two spring chambers 8 on that side which faces the bearing outer ring 2. Plate springs are preferably inserted into these spring chambers 8 as spring elements which create a radial prestress force (that is to say one which is directed toward the axis of rotation A or away from the axis of rotation A), in the retainer bearing 1. The spring elements themselves are not illustrated for reasons of clarity.

The entire retainer bearing 1 is fixed by means of two covering rings 3, 4, with the covering rings 3, 4 clamping the sliding elements 7 laterally. The covering rings 3, 4 are mounted on the bearing outer ring 2 by means of mounting screws 9. Furthermore, the bearing rings 2, 5 and the sliding elements 7 are produced from steel.

Figure 3:
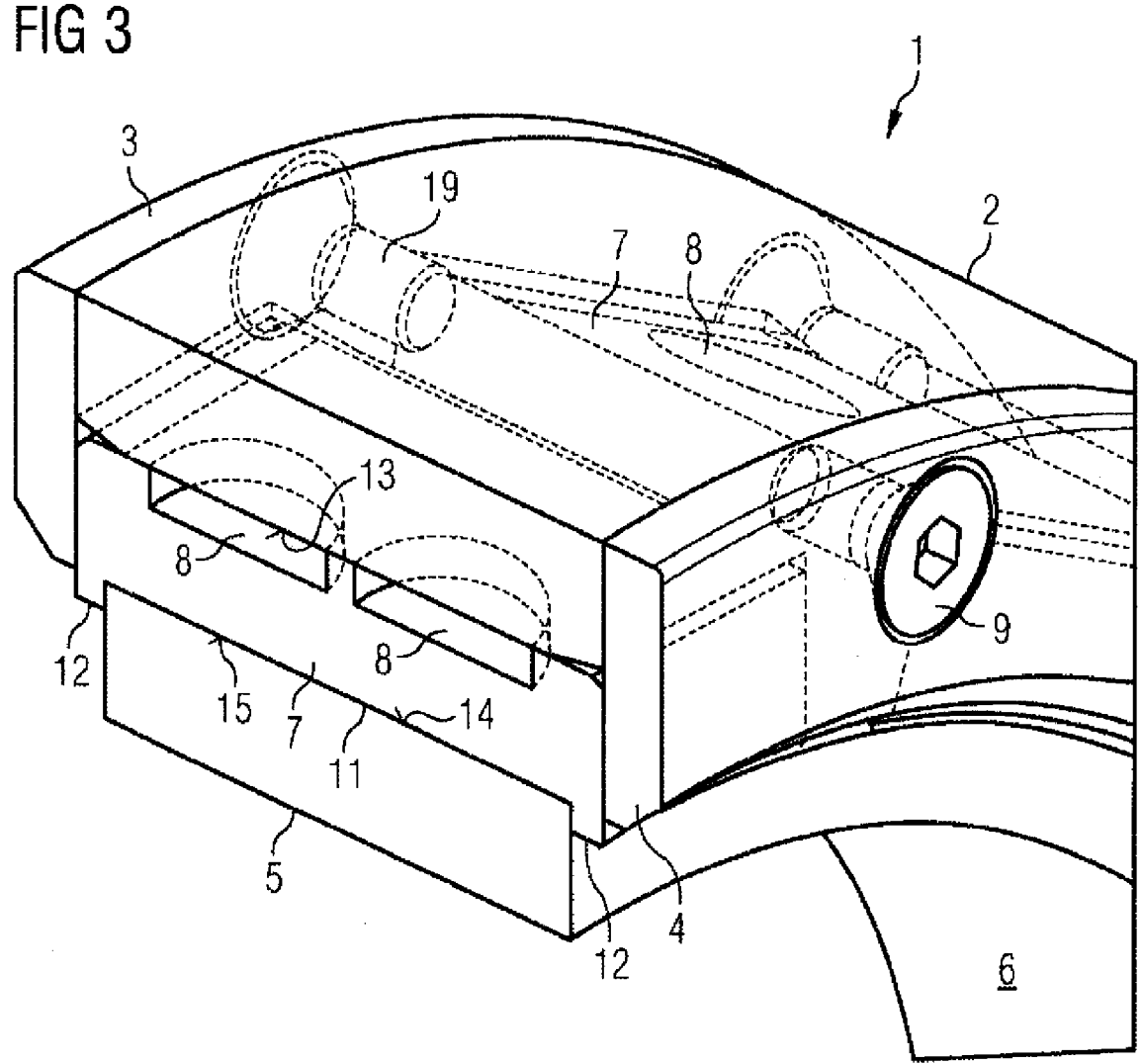
FIG. 3 shows a detailed perspective view of a cross section through the retainer bearing shown in FIG. 2 along sectional line III.

FIG. 3 shows a detailed perspective view of a cross section through the retainer bearing 1 shown in FIG. 2 along the sectional line III. FIG. 3 shows the sandwich structure of the retainer bearing 1 with a sliding element 7 clamped between the bearing outer ring 2 and the bearing inner ring 5. The cross section through the shown sliding element 7 shows the two spring chambers 8 for holding the spring elements (not shown further). The spring elements are supported on the inner surface 13 of the bearing outer ring 2 and as a result create the radially acting prestress force which presses the relevant sliding element 7 against an outer surface 14 of the bearing inner ring 5 without play.

In the example of FIG. 3, a thin sliding layer 11 is applied to the inner friction surface 15 of the sliding element 7 shown. The sliding layer 11 typically has a thickness of less than 1 mm. The material pairing made up of friction layer 11 and outer surface 14 of the bearing inner ring 5 are matched to one another such that a coefficient of sliding friction in the range of from 0.05 to 0.15 results. The inner friction surface 15 is geometrically matched to the outer surface 14 of the bearing inner ring 5, with the bearing inner ring 5 having a rectangular cross section in a manner corresponding to the example in FIG. 3. The inner surface 15 of the shown sliding element 7 accordingly corresponds to a lateral inner surface of a cylinder for a portion of the circumference.

Each sliding element 7 also has two guide webs 12 which run in the circumferential direction of the retainer bearing 1 and laterally surround the bearing inner ring 5 for guidance purposes.

Furthermore, according to the invention, the inner surface 6 of the bearing inner ring 5 and the outer surface of the rotor shaft 23 (not shown any further) of the electric machine 20, which rotor shaft is to be held, are provided such that a coefficient of static friction of at least 0.4 results in the event of retention. After the rotor shaft 23 impacts in the retainer bearing 1, the inner ring 5 is therefore immediately made to rotate. Since the jolt of impact does not act directly on the friction layer 11, said jolt of impact is distributed over a considerably larger region of the friction layer 11 which lies in the radial direction of the jolt of impact on account of the inner ring 5 between said jolt of impact and friction layer. The bearing inner ring 5 rotates away under the rotor shaft 23 even after a very short time. If the inner surface 6 of the bearing inner ring 5 and the outer surface of the rotor shaft 23 are produced from hardened steel, they are virtually undamaged when the rotor shaft 23 impacts in the retainer bearing 1.

What is claimed is:

1. A retainer bearing for retaining a rotor shaft of an electric machine, comprising:
   a bearing outer ring made of steel and having an inner surface;
   a bearing inner ring made of steel and having an outer surface; and
   at least one sliding element placed between the bearing outer ring and the bearing inner ring and prestressed in a radial direction of the retainer bearing,
   wherein either the inner surface of the bearing outer ring and an adjoining outer friction surface of the at least one sliding element are configured to establish a coefficient of sliding friction in the range of from 0.05 to 0.15, or the outer surface of the bearing inner ring and an adjoining inner friction surface of the at least one sliding element are configured to establish a coefficient of sliding friction in the range of from 0.05 to 0.15.

2. The retainer bearing of claim 1, further comprising a radially acting spring element placed between the at least one sliding element and one member selected from the group consisting of the bearing outer ring and the bearing inner ring in order to maintain the at least one sliding element under tension in the radial direction.

3. The retainer bearing of claim 2, wherein the at least one sliding element has at least one spring chamber for receiving the spring element.

4. The retainer bearing of claim 2, wherein the spring element is a plate spring.

5. The retainer bearing of claim 1, further comprising a plurality of said sliding element constructed in the form of ring segments and placed between the bearing outer ring and the bearing inner ring.

6. The retainer bearing of claim 1, wherein the at least one of the sliding elements is made from steel or ceramic.

7. The retainer bearing of claim 5, further comprising a sliding layer applied to at least one member selected from the group consisting of the inner surface of the bearing outer ring and the outer friction surface of the at least one sliding element, when the inner surface of the bearing outer ring and the adjoining outer friction surface of the at least one sliding element are configured to establish a coefficient of sliding friction in the range of from 0.05 to 0.15.

8. The retainer bearing of claim 5, further comprising a sliding layer applied to at least one member selected from the group consisting of the outer surface of the bearing inner ring and the inner friction surface of the at least one sliding element, when the outer surface of the bearing inner ring and the adjoining inner friction surface of the at least one sliding element are configured to establish a coefficient of sliding friction in the range of from 0.05 to 0.15.

9. The retainer bearing of claim 1, wherein the inner surface of the bearing inner ring and an outer surface of the rotor shaft being received are configured to establish a coefficient of static friction of at least 0.4 in the event of retention.

10. The retainer bearing of claim 1, wherein the retainer bearing is a dry friction bearing.

11. An electric machine, in particular a turbomachine, comprising:
   a rotor shaft; and
   at least one retainer bearing for retaining the rotor shaft, said retainer bearing comprising:
      a bearing outer ring made of steel and having an inner surface;
      a bearing inner ring made of steel and having an outer surface; and
      at least one sliding element placed between the bearing outer ring and the bearing inner ring and prestressed in a radial direction of the retainer bearing,
   wherein either the inner surface of the bearing outer ring and an adjoining outer friction surface of the at least one sliding element are configured to establish a coefficient of sliding friction in the range of from 0.05 to 0.15, or the outer surface of the bearing inner ring and an adjoining inner friction surface of the at least one sliding element are configured to establish a coefficient of sliding friction in the range of from 0.05 to 0.15.

12. The electric machine of claim 11, further comprising at least one magnetic bearing for supporting the rotor shaft during normal operation.

13. The electric machine of claim 11, wherein the electric machine is an electric motor or generator.

14. The electric machine of claim 11, having a rated electrical power of at least 500 kW.

* * * * *